US012034382B2

(12) United States Patent
Zhang et al.

(10) Patent No.: US 12,034,382 B2
(45) Date of Patent: Jul. 9, 2024

(54) THREE-PHASE SINGLE-STAGE ISOLATED BIDIRECTIONAL CONVERTER AND CONTROLLING METHOD

(71) Applicant: Guochuang Innovation Center of Mobile Energy Jiangsu Co., Ltd., Jiangsu (CN)

(72) Inventors: Yutan Zhang, Jiangsu (CN); Guoce Li, Jiangsu (CN); Wendi Song, Jiangsu (CN); Yangyang Qian, Jiangsu (CN); Hsien-Yi Tsai, Jiangsu (CN)

(73) Assignee: Guochuang Innovation Center of Mobile Energy (Jiangsu) Co., Ltd., Jiangsu (CN)

( * ) Notice: Subject to any disclaimer, the term of this patent is extended or adjusted under 35 U.S.C. 154(b) by 0 days.

(21) Appl. No.: 18/335,115

(22) Filed: Jun. 14, 2023

(65) Prior Publication Data

US 2023/0327578 A1    Oct. 12, 2023

Related U.S. Application Data

(63) Continuation-in-part of application No. 17/728,926, filed on Apr. 25, 2022, now Pat. No. 11,728,749.

(30) Foreign Application Priority Data

Jun. 24, 2021 (CN) .......................... 202110702252.9
Aug. 10, 2022 (CN) .......................... 202210953808.6

(51) Int. Cl.
*H02M 7/797* (2006.01)
*H02M 1/14* (2006.01)

(52) U.S. Cl.
CPC ............. *H02M 7/797* (2013.01); *H02M 1/14* (2013.01)

(58) Field of Classification Search
CPC ........ H02M 1/0067; H02M 7/66; H02M 7/79; H02M 7/797
See application file for complete search history.

(56) References Cited

U.S. PATENT DOCUMENTS 7,239,530 B1*   7/2007  Djekic ............... H02M 3/33592
                                                      363/16
2015/0244279 A1*  8/2015  Takagi ............... H02M 3/33584
                                                      363/17

* cited by examiner

*Primary Examiner* — Gary L Laxton
(74) *Attorney, Agent, or Firm* — JCIPRNET

(57) ABSTRACT

A three-phase single-stage isolated bidirectional converter and a method of controlling same are provided. The bidirectional converter includes a three-phase AC voltage port, a DC voltage port, full-bridge circuit units, half-bridge circuit units, phase-shift inductor units, transformers, and filter capacitors. The first full-bridge circuit unit is connected to the first half-bridge circuit unit. The third full-bridge circuit unit is connected to the second half-bridge circuit unit. The fifth full-bridge circuit unit is connected to the third half-bridge circuit unit. The first half-bridge circuit unit is connected to the first filter capacitor. A midpoint of a bridge arm of the first half-bridge circuit unit is connected to a second port. A midpoint of a bridge arm of the second half-bridge circuit unit is connected to a fourth port. A midpoint of a bridge arm of the third half-bridge circuit unit is connected to a sixth port.

8 Claims, 2 Drawing Sheets

THREE-PHASE SINGLE-STAGE ISOLATED BIDIRECTIONAL CONVERTER AND CONTROLLING METHOD

CROSS-REFERENCE TO RELATED APPLICATION

This application is a continuation-in-part application of and claims the priority benefit of U.S. application Ser. No. 17/728,926, filed on Apr. 25, 2022, now pending. The prior U.S. application Ser. No. 17/728,926 claims the priority benefit of China application serial no. 202110702252.9, filed on Jun. 24, 2021. This application also claims the priority benefit of China application serial no. 202210953808.6, filed on Aug. 10, 2022. The entirety of each of the above-mentioned patent applications is hereby incorporated by reference herein and made a part of this specification.

BACKGROUND

Technical Field

The disclosure relates to the technical field of power electronics, and in particular, relates to a three-phase single-stage isolated bidirectional converter and a method of controlling the three-phase single-stage isolated bidirectional converter.

DESCRIPTION OF RELATED ART

In the related art, the three-phase single-stage isolated AC/DC bidirectional converter has low working efficiency and accuracy, so that the reliability of the system is lowered.

SUMMARY

The technical solutions adopted by the disclosure are provided as follows.

The disclosure provides a three-phase single-stage isolated bidirectional converter including a three-phase alternating current (AC) voltage port, a direct current (DC) voltage port, first to sixth full-bridge circuit units, first to third half-bridge circuit units, first to third phase-shift inductor units, first to third transformers, first to third filter capacitors. Herein, the three-phase AC voltage port includes first to sixth ports, and the DC voltage port includes a seventh port and an eighth port. The first transformer includes a first winding and a second winding. The first winding is provided with a first center tap, and the first center tap is connected to the first port. Two ends of the first winding are respectively connected to midpoints of two bridge arms of the first full-bridge circuit unit through the first phase-shift inductor unit. Two ends of the second winding are respectively connected to midpoints of two bridge arms of the second full-bridge circuit unit. The second transformer includes a third winding and a fourth winding. The third winding is provided with a second center tap, and the second center tap is connected to the third port. Two ends of the third winding are respectively connected to midpoints of two bridge arms of the third full-bridge circuit unit through the second phase-shift inductor unit. Two ends of the fourth winding are respectively connected to midpoints of two bridge arms of the fourth full-bridge circuit unit. The third transformer includes a fifth winding and a sixth winding. The fifth winding is provided with a third center tap, and the third center tap is connected to the fifth port. Two ends of the fifth winding are respectively connected to midpoints of two bridge arms of the fifth full-bridge circuit unit through the third phase-shift inductor unit. Two ends of the sixth winding are respectively connected to midpoints of two bridge arms of the sixth full-bridge circuit unit. Two ends of the first full-bridge circuit unit are respectively connected to two ends of the first half-bridge circuit unit. Two ends of the third full-bridge circuit unit are respectively connected to two ends of the second half-bridge circuit unit. Two ends of the fifth full-bridge circuit unit are respectively connected to two ends of the third half-bridge circuit unit. The two ends of the first half-bridge circuit unit are further connected to two ends of the first filter capacitor, and a midpoint of a bridge arm of the first half-bridge circuit unit is connected to the second port. The two ends of the second half-bridge circuit unit are further connected to two ends of the second filter capacitor, and a midpoint of a bridge arm of the second half-bridge circuit unit is connected to the fourth port. The two ends of the third half-bridge circuit unit are further connected to two ends of the third filter capacitor, and a midpoint of a bridge arm of the third half-bridge circuit unit is connected to the sixth port. Two ends of the second full-bridge circuit unit are respectively connected to the seventh port and the eighth port. Two ends of the fourth full-bridge circuit unit are respectively connected to the seventh port and the eighth port. Two ends of the sixth full-bridge circuit unit are respectively connected to the seventh port and the eighth port. The following each of switch transistors of the three-phase single-stage isolated bidirectional converter may be an exemplary embodiment of a power semiconductor device.

The first full-bridge circuit unit includes a first switch transistor and a second switch transistor connected in series and a third switch transistor and a fourth switch transistor connected in series. A first end of the first switch transistor is connected to a first end of the second switch transistor. A connection point between the first switch transistor and the second switch transistor is a first midpoint of the midpoints of the two bridge arms of the first full-bridge circuit unit. A first end of the third switch transistor is connected to a first end of the fourth switch transistor. A connection point between the third switch transistor and the fourth switch transistor is a second midpoint of the midpoints of the two bridge arms of the first full-bridge circuit unit. A second end of the third switch transistor is connected to a second end of the first switch transistor, and a second end of the fourth switch transistor is connected to a second end of the second switch transistor. The third full-bridge circuit unit includes a fifth switch transistor and a sixth switch transistor connected in series and a seventh switch transistor and an eighth switch transistor connected in series. A first end of the fifth switch transistor is connected to a first end of the sixth switch transistor. A connection point between the fifth switch transistor and the sixth switch transistor is a first midpoint of the midpoints of the two bridge arm of the third full-bridge circuit unit. A first end of the seventh switch transistor is connected to a first end of the eighth switch transistor. A connection point between the seventh switch transistor and the eighth switch transistor is a second midpoint of the midpoints of the two bridge arms of the third full-bridge circuit unit. A second end of the seventh switch transistor is connected to a second end of the fifth switch transistor, and a second end of the eighth switch transistor is connected to a second end of the sixth switch transistor. The fifth full-bridge circuit unit includes a ninth switch transistor and a tenth switch transistor connected in series and an eleventh switch transistor and a twelfth switch transistor connected in series. A first end of the ninth switch transistor is connected to a first end of the tenth switch transistor. A connection point between the ninth switch transistor and the tenth switch transistor is a first midpoint of the midpoints of the two bridge arms of the fifth full-bridge circuit unit. A first end of the eleventh switch transistor is connected to a first end of the twelfth switch transistor. A connection point between the eleventh switch transistor and the twelfth switch transistor is a second midpoint of the midpoints of the two bridge arms of the fifth full-bridge circuit unit. A second end of the eleventh switch transistor is connected to a second end of the ninth switch transistor, and a second end of the twelfth switch transistor is connected to a second end of the tenth switch transistor.

The first half-bridge circuit unit includes a thirteenth switch transistor and a fourteenth switch transistor connected in series. A first end of the thirteenth switch transistor is connected to a first end of the fourteenth switch transistor. A connection point between the thirteenth switch transistor and the fourteenth switch transistor is the midpoint of the bridge arm of the first half-bridge circuit unit. A second end of the thirteenth switch transistor is connected to the second end of the third switch transistor, and a second end of the fourteenth switch transistor is connected to the second end of the fourth switch transistor. The second half-bridge circuit unit includes a fifteenth switch transistor and a sixteenth switch transistor connected in series. A first end of the fifteenth switch transistor is connected to a first end of the sixteenth switch transistor. A connection point between the fifteenth switch transistor and the sixteenth switch transistor is the midpoint of the bridge arm of the second half-bridge circuit unit. A second end of the fifteenth switch transistor is connected to the second end of the seventh switch transistor, and a second end of the sixteenth switch transistor is connected to the second end of the eighth switch transistor. The third half-bridge circuit unit includes a seventeenth switch transistor and an eighteenth switch transistor connected in series. A first end of the seventeenth switch transistor is connected to a first end of the eighteenth switch transistor. A connection point between the seventeenth switch transistor and the eighteenth switch transistor is the midpoint of the bridge arm of the third half-bridge circuit unit. A second end of the seventeenth switch transistor is connected to the second end of the eleventh switch transistor, and a second end of the eighteenth switch transistor is connected to the second end of the twelfth switch transistor.

The first phase-shift inductor unit includes a first phase-shift inductor and a second phase-shift inductor. One end of the first phase-shift inductor is connected to the first midpoint of the two bridge arms of the first full-bridge circuit unit, and the other end of the first phase-shift inductor is connected to one end of the first winding. One end of the second phase-shift inductor is connected to the second midpoint of the two bridge arms of the first full-bridge circuit unit, and the other end of the second phase-shift inductor is connected to the other end of the first winding. The second phase-shift inductor unit includes a third phase-shift inductor and a fourth phase-shift inductor. One end of the third phase-shift inductor is connected to the first midpoint of the two bridge arms of the third full-bridge circuit unit, and the other end of the third phase-shift inductor is connected to one end of the third winding. One end of the fourth phase-shift inductor is connected to the second midpoint of the two bridge arms of the third full-bridge circuit unit, and the other end of the fourth phase-shift inductor is connected to the other end of the third winding. The third phase-shift inductor unit includes a fifth phase-shift inductor and a sixth phase-shift inductor. One end of the fifth phase-shift inductor is connected to the first midpoint of the two bridge arms of the fifth full-bridge circuit unit, and the other end of the fifth phase-shift inductor is connected to one end of the fifth winding. One end of the sixth phase-shift inductor is connected to the second midpoint of the two bridge arms of the fifth full-bridge circuit unit, and the other end of the sixth phase-shift inductor is connected to the other end of the fifth winding.

The second full-bridge circuit unit includes a nineteenth switch transistor and a twentieth switch transistor connected in series and a twenty-first switch transistor and a twenty-second switch transistor connected in series. A first end of the nineteenth switch transistor is connected to a first end of the twentieth switch transistor. A connection point between the nineteenth switch transistor and the twentieth switch transistor is a first midpoint of the midpoints of the two bridge arms of the second full-bridge circuit unit. A first end of the twenty-first switch transistor is connected to a first end of the twenty-second switch transistor. A connection point between the twenty-first switch transistor and the twenty-second switch transistor is a second midpoint of the midpoints of the two bridge arms of the second full-bridge circuit unit. A second end of the twenty-first switch transistor is connected to a second end of the nineteenth switch transistor, and a second end of the twenty-second switch transistor is connected to a second end of the twentieth switch transistor. The fourth full-bridge circuit unit includes a twenty-third switch transistor and a twenty-fourth switch transistor connected in series and a twenty-fifth switch transistor and a twenty-sixth switch transistor connected in series. A first end of the twenty-third switch transistor is connected to a first end of the twenty-fourth switch transistor. A connection point between the twenty-third switch transistor and the twenty-fourth switch transistor is a first midpoint of the midpoints of the two bridge arms of the fourth full-bridge circuit unit. A first end of the twenty-fifth switch transistor is connected to a first end of the twenty-sixth switch transistor. A connection point between the twenty-fifth switch transistor and the twenty-sixth switch transistor is a second midpoint of the midpoints of the two bridge arms of the fourth full-bridge circuit unit. A second end of the twenty-fifth switch transistor is connected to a second end of the twenty-third switch transistor, and a second end of the twenty-sixth switch transistor is connected to a second end of the twenty-fourth switch transistor. The sixth full-bridge circuit unit includes a twenty-seventh switch transistor and a twenty-eighth switch transistor connected in series and a twenty-ninth switch transistor and a thirtieth switch transistor connected in series. A first end of the twenty-seventh switch transistor is connected to a first end of the twenty-eighth switch transistor. A connection point between the twenty-seventh switch transistor and the twenty-eighth switch transistor is a first midpoint of the midpoints of the two bridge arms of the sixth full-bridge circuit unit. A first end of the twenty-ninth switch transistor is connected to a first end of the thirtieth switch transistor. A connection point between the twenty-ninth switch transistor and the thirtieth switch transistor is a second midpoint of the midpoints of the two bridge arms of the sixth full-bridge circuit unit. A second end of the twenty-ninth switch transistor is connected to a second end of the twenty-seventh switch transistor, and a second end of the thirtieth switch transistor is connected to a second end of the twenty-eighth switch transistor.

The disclosure further provides a method of controlling the three-phase single-stage isolated bidirectional converter, and the method includes the following steps. When a rectification control command or an inversion control command is received, a DC current of the DC voltage port is sampled. A three-phase AC voltage and a three-phase AC current of the three-phase AC voltage port are sampled A dual closed-loop control strategy is adopted to generate a driving signal with a duty ratio of 50% according to the DC current, the three-phase AC voltage, and the three-phase AC current. Further, the driving signal is sent to driving ends of the first to thirtieth switch transistors to control the three-phase single-stage isolated bidirectional converter to work in the rectification mode or the inversion mode.

A method of controlling the three-phase single-stage isolated bidirectional converter is configured to control the driving signal corresponding to the first full-bridge circuit unit to lead the driving signal corresponding to the second full-bridge circuit unit, control the driving signal corresponding to the third full-bridge circuit unit to lead the driving signal corresponding to the fourth full-bridge circuit unit, and control the driving signal corresponding to the fifth full-bridge circuit unit to lead the driving signal corresponding to the sixth full-bridge circuit unit. The dual closed-loop control strategy is adopted to calculate a phase angle at which the driving signal corresponding to the first full-bridge circuit unit leads the driving signal corresponding to the second full-bridge circuit unit, a phase angle at which the driving signal corresponding to the third full-bridge circuit unit leads the driving signal corresponding to the fourth full-bridge circuit unit, and a phase angle at which the driving signal corresponding to the fifth full-bridge circuit unit leads the driving signal corresponding to the sixth full-bridge circuit unit.

When the three-phase single-stage isolated bidirectional converter works in the inversion mode, the driving signal corresponding to the first full-bridge circuit unit is controlled to lag behind the driving signal corresponding to the second full-bridge circuit unit. The driving signal corresponding to the third full-bridge circuit unit is controlled to lag behind the driving signal corresponding to the fourth full-bridge circuit unit. The driving signal corresponding to the fifth full-bridge circuit unit is controlled to lag behind the driving signal corresponding to the sixth full-bridge circuit unit. The dual closed-loop control strategy is adopted to calculate a phase angle at which the driving signal corresponding to the first full-bridge circuit unit lags behind the driving signal corresponding to the second full-bridge circuit unit, a phase angle at which the driving signal corresponding to the third full-bridge circuit unit lags behind the driving signal corresponding to the fourth full-bridge circuit unit, and a phase angle at which the driving signal corresponding to the fifth full-bridge circuit unit lags behind the driving signal corresponding to the sixth full-bridge circuit unit.

DESCRIPTION OF THE EMBODIMENTS

Description will now be made in detail to clearly and completely present preferred embodiments of the disclosure, examples of which are illustrated in the accompanying drawings. Nevertheless, the disclosed embodiments are merely part of the embodiments of the disclosure, not all the embodiments. Based on the embodiments of the disclosure, all other embodiments obtained by a person having ordinary skill in the art without making any inventive effort fall within the scope that the disclosure seeks to protect.

To solve the above problem, the disclosure provides a three-phase single-stage isolated bidirectional converter in which only one stage of power conversion is included, and in this way, the working efficiency and accuracy of the converter are improved, and the reliability of the system is enhanced.

Beneficial effects provided by the disclosure include the following.

In the disclosure, only one stage of power conversion is included, so the working efficiency and accuracy of the converter are improved, and the reliability of the system is enhanced.

Figure 1:
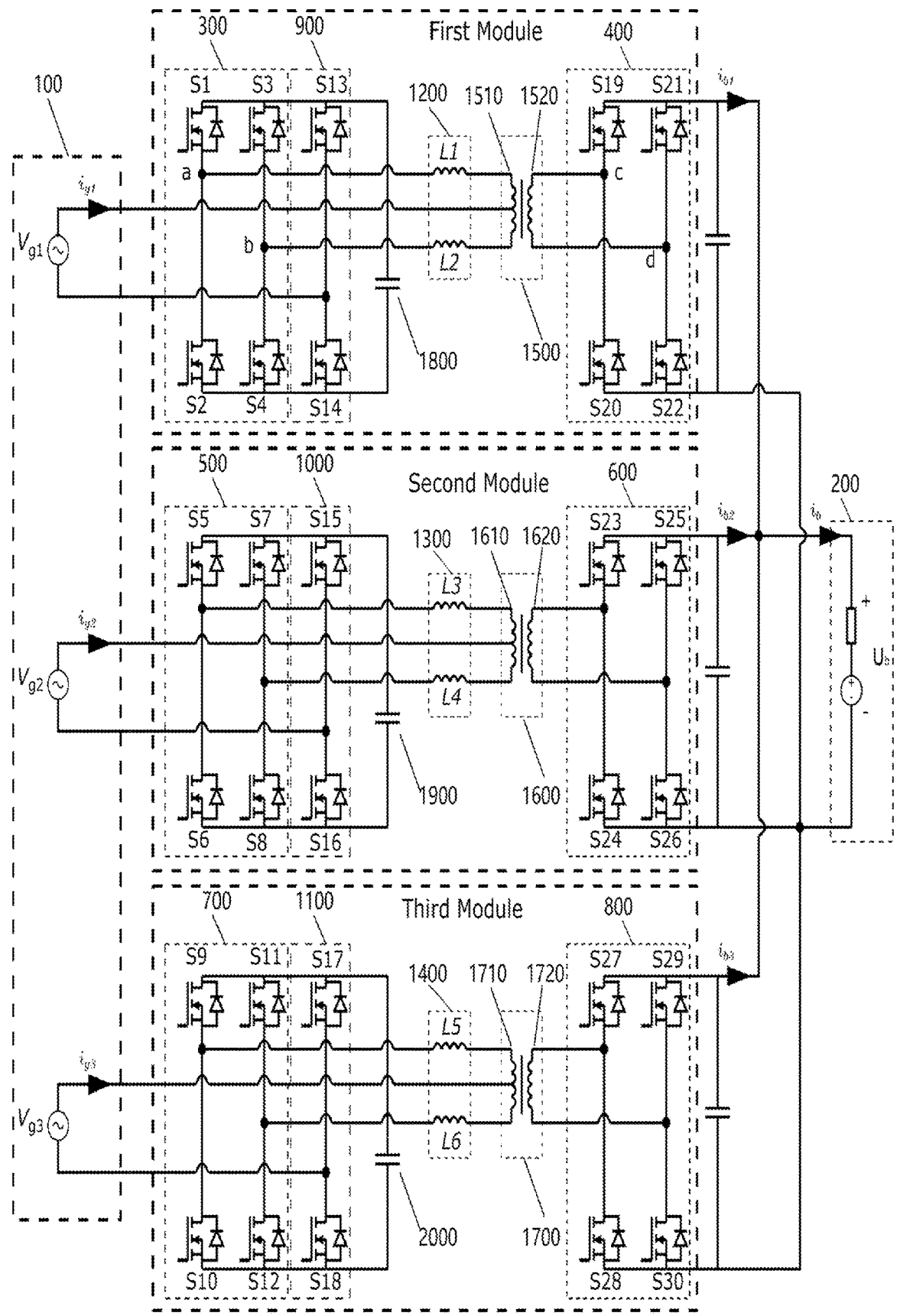
FIG. 1 is a schematic diagram of a three-phase single-stage isolated bidirectional converter according to an embodiment of the disclosure.

FIG. 1 is a schematic diagram of a three-phase single-stage isolated bidirectional converter according to an embodiment of the disclosure.

As shown in FIG. 1, a three-phase single-stage isolated bidirectional converter provided by the embodiments of the disclosure may include a three-phase alternating current (AC) voltage port 100, a direct current (DC) voltage port 200, first to sixth full-bridge circuit units 300 to 800, first to third half-bridge circuit units 900 to 1100, first to third phase-shift inductor units 1200 to 1400, first to third transformers 1500 to 1700, and first to third filter capacitors 1800 to 2000.

Herein, the three-phase AC voltage port 100 includes first to sixth ports, and the DC voltage port 200 includes a seventh port and an eighth port. The first transformer 1500 includes a first winding 1510 and a second winding 1520. The first winding 1510 is provided with a first center tap, and the first center tap is connected to the first port. Two ends of the first winding 1510 are respectively connected to midpoints (i.e., the connection points a and b) of two bridge arms of the first full-bridge circuit unit 300 through the first phase-shift inductor unit 1200. Two ends of the second winding 1520 are respectively connected to midpoints (i.e., the connection points c and d) of two bridge arms of the second full-bridge circuit unit 400. The second transformer 1600 includes a third winding 1610 and a fourth winding 1620. The third winding 1610 is provided with a second center tap, and the second center tap is connected to the third port. Two ends of the third winding 1610 are respectively connected to midpoints of two bridge arms of the third full-bridge circuit unit 500 through the second phase-shift inductor unit 1300. Two ends of the fourth winding 1620 are respectively connected to midpoints of two bridge arms of the fourth full-bridge circuit unit 600. The third transformer 1700 includes a fifth winding 1710 and a sixth winding 1720. The fifth winding 1710 is provided with a third center tap, and the third center tap is connected to the fifth port. Two ends of the fifth winding 1710 are respectively connected to midpoints of two bridge arms of the fifth full-bridge circuit unit 700 through the third phase-shift inductor unit 1400. Two ends of the sixth winding 1720 are respectively connected to midpoints of two bridge arms of the sixth full-bridge circuit unit 800. Two ends of the first full-bridge circuit unit 300 are respectively connected to two ends of the first half-bridge circuit unit 900. Two ends of the third full-bridge circuit unit 500 are respectively connected to two ends of the second half-bridge circuit unit 1000. Two ends of the fifth full-bridge circuit unit 700 are respectively connected to two ends of the third half-bridge circuit unit 1100. The two ends of the first half-bridge circuit unit 900 are further respectively connected to two ends of the first filter capacitor 1800, and a midpoint of a bridge arm of the first half-bridge circuit unit 900 is connected to the second port. The two ends of the second half-bridge circuit unit 1000 are further respectively connected to two ends of the second filter capacitor 1900, and a midpoint of a bridge arm of the second half-bridge circuit unit 1000 is connected to the fourth port. The two ends of the third half-bridge circuit unit 1100 are further respectively connected to two ends of the third filter capacitor 2000, and a midpoint of a bridge arm of the third half-bridge circuit unit 1100 is connected to the sixth port. Two ends of the second full-bridge circuit unit 400 are respectively connected to the seventh port and the eighth port. Two ends of the fourth full-bridge circuit unit 600 are respectively connected to the seventh port and the eighth port. Two ends of the sixth full-bridge circuit unit 800 are respectively connected to the seventh port and the eighth port. Herein, the two ends of the second full-bridge circuit unit 400, the two ends of the fourth full-bridge circuit unit 600, and the two ends of the sixth full-bridge circuit unit 800 may be connected to the seventh port and the eighth port through the corresponding capacitors.

Herein, as shown in FIG. 1, the first full-bridge circuit unit 300, the first half-bridge circuit unit 900, the second full-bridge circuit unit 400, the first phase-shift inductor unit 1200, and the first transformer 1500 may be integrated into a first module. The third full-bridge circuit unit 500, the second half-bridge circuit unit 1000, the fourth full-bridge circuit unit 600, the second phase-shift inductor unit 1300, and the second transformer 1600 may be integrated into a second module. The fifth full-bridge circuit unit 700, the third half-bridge circuit unit 1100, the sixth full-bridge circuit unit 800, the third phase-shift inductor unit 1400, and the third transformer 1700 may be integrated into a third module.

According to an embodiment of the disclosure, as shown in FIG. 1, the first full-bridge circuit unit 300 may include a first switch transistor S1 and a second switch transistor S2 connected in series, and a third switch transistor S3 and a fourth switch transistor S4 connected in series. A first end of the first switch transistor S1 is connected to a first end of the second switch transistor S2. A connection point a between the first switch transistor S1 and the second switch transistor S2 is the midpoint of one bridge arm of the first full-bridge circuit unit 300. A first end of the third switch transistor S3 is connected to a first end of the fourth switch transistor S4. A connection point b between the third switch transistor S3 and the fourth switch transistor S4 is the midpoint of the other bridge arm of the first full-bridge circuit unit 300. A second end of the third switch transistor S3 is connected to a second end of the first switch transistor S1, and a second end of the fourth switch transistor S4 is connected to a second end of the second switch transistor S2. The third full-bridge circuit unit 500 may include a fifth switch transistor S5 and a sixth switch transistor S6 connected in series, and a seventh switch transistor S7 and an eighth switch transistor S8 connected in series. A first end of the fifth switch transistor S5 is connected to a first end of the sixth switch transistor S6. A connection point between the fifth switch transistor S5 and the sixth switch transistor S6 is the midpoint of one bridge arm of the third full-bridge circuit unit 500. A first end of the seventh switch transistor S7 is connected to a first end of the eighth switch transistor S8. A connection point between the seventh switch transistor S7 and the eighth switch transistor S8 is the midpoint of the other bridge arm of the third full-bridge circuit unit 500. A second end of the seventh switch transistor S7 is connected to a second end of the fifth switch transistor S5, and a second end of the eighth switch transistor S8 is connected to a second end of the sixth switch transistor S6. The fifth full-bridge circuit unit 700 may include a ninth switch transistor S9 and a tenth switch transistor S10 connected in series, and an eleventh switch transistor S11 and a twelfth switch transistor S12 connected in series. A first end of the ninth switch transistor S9 is connected to a first end of the tenth switch transistor S10. A connection point between the ninth switch transistor S9 and the tenth switch transistor S10 is the midpoint of one bridge arm of the fifth full-bridge circuit unit 700. A first end of the eleventh switch transistor S11 is connected to a first end of the twelfth switch transistor S12. A connection point between the eleventh switch transistor S11 and the twelfth switch transistor S12 is the midpoint of the other bridge arm of the fifth full-bridge circuit unit 700. A second end of the eleventh switch transistor S11 is connected to a second end of the ninth switch transistor S9, and a second end of the twelfth switch transistor S12 is connected to a second end of the tenth switch transistor S10.

According to an embodiment of the disclosure, as shown in FIG. 1, the first half-bridge circuit unit 900 may include a thirteenth switch transistor S13 and a fourteenth switch transistor S14 connected in series. A first end of the thirteenth switch transistor S13 is connected to a first end of the fourteenth switch transistor S14. A connection point between the thirteenth switch transistor S13 and the fourteenth switch transistor S14 is the midpoint of the bridge arm of the first half-bridge circuit unit 900. A second end of the thirteenth switch transistor S13 is connected to the second end of the third switch transistor S3, and a second end of the fourteenth switch transistor S14 is connected to the second end of the fourth switch transistor S4. The second half-bridge circuit unit 1000 may include a fifteenth switch transistor S15 and a sixteenth switch transistor S16 connected in series. A first end of the fifteenth switch transistor S15 is connected to a first end of the sixteenth switch transistor S16. A connection point between the fifteenth switch transistor S15 and the sixteenth switch transistor S16 is the midpoint of the bridge arm of the second half-bridge circuit unit 1000. A second end of the fifteenth switch transistor S15 is connected to the second end of the seventh switch transistor S7, and a second end of the sixteenth switch transistor S16 is connected to the second end of the eighth switch transistor S8. The third half-bridge circuit unit 1100 may include a seventeenth switch transistor S17 and an eighteenth switch transistor S18 connected in series. A first end of the seventeenth switch transistor S17 is connected to a first end of the eighteenth switch transistor S18. A connection point between the seventeenth switch transistor S17 and the eighteenth switch transistor S18 is the midpoint of the bridge arm of the third half-bridge circuit unit 1100. A second end of the seventeenth switch transistor S17 is connected to the second end of the eleventh switch transistor S11, and a second end of the eighteenth switch transistor S18 is connected to the second end of the twelfth switch transistor S12.

According to an embodiment of the disclosure, as shown in FIG. 1, the first phase-shift inductor unit 1200 may include a first phase-shift inductor L1 and a second phase-shift inductor L2. One end of the first phase-shift inductor L1 is connected to the midpoint (i.e., the connection point a) of one bridge arm of the first full-bridge circuit unit 300, and the other end of the first phase-shift inductor L1 is connected to one end of the first winding 1510. One end of the second phase-shift inductor L2 is connected to the midpoint (i.e., the connection point b) of the other bridge arm of the first full-bridge circuit unit 300, and the other end of the second phase-shift inductor L2 is connected to the other end of the first winding 1510. The second phase-shift inductor unit 1300 includes a third phase-shift inductor L3 and a fourth phase-shift inductor L4. One end of the third phase-shift inductor L3 is connected to the midpoint of one bridge arm of the third full-bridge circuit unit 500, and the other end of the third phase-shift inductor L3 is connected to one end of the third winding 1610. One end of the fourth phase-shift inductor L4 is connected to the midpoint of the other bridge arm of the third full-bridge circuit unit 500, and the other end of the fourth phase-shift inductor L4 is connected to the other end of the third winding 1610. The third phase-shift inductor unit 1400 includes a fifth phase-shift inductor L5 and a sixth phase-shift inductor L6. One end of the fifth phase-shift inductor L5 is connected to the midpoint of one bridge arm of the fifth full-bridge circuit unit 700, and the other end of the fifth phase-shift inductor L5 is connected to one end of the fifth winding 1710. One end of the sixth phase-shift inductor L6 is connected to the midpoint of the other bridge arm of the fifth full-bridge circuit unit 700, and the other end of the sixth phase-shift inductor L6 is connected to the other end of the fifth winding 1710.

Herein, the inductance of the first phase-shift inductor L1 and the second phase-shift inductor L2 are the same, and a coupling relationship may or may not be provided therebetween. If no coupling relationship is provided between the first phase-shift inductor L1 and the second phase-shift inductor L2, the inductances of the first phase-shift inductor L1 and the second phase-shift inductor L2 may be recorded as $L_p$. If a coupling relationship is provided between the first phase-shift inductor L1 and the second phase-shift inductor L2, the differential mode inductance may be recorded as $L_{p,dm}$, and the common mode inductance may be recorded as $L_{p,cm}$. The coils of the first phase-shift inductor L1 and the second phase-shift inductor L2 may be wound on two magnetic columns of a magnetic core, may be wound on two magnetic cores, and may also be wound on the magnetic core of the first transformer 1500 as a leakage inductor. Similarly, the third phase-shift inductor L3 and the fourth phase-shift inductor L4, the fifth phase-shift inductor L5 and the sixth phase-shift inductor L6 may be configured in the same way.

According to an embodiment of the disclosure, as shown in FIG. 1, the second full-bridge circuit unit 400 includes a nineteenth switch transistor S19 and a twentieth switch transistor S20 connected in series, and a twenty-first switch transistor S21 and a twenty-second S22 switch transistor connected in series. A first end of the nineteenth switch transistor S19 is connected to a first end of the twentieth switch transistor S20. A connection point between the nineteenth switch transistor S19 and the twentieth switch transistor S20 is the midpoint (i.e., the connection point c) of one bridge arm of the second full-bridge circuit unit 400. A first end of the twenty-first switch transistor S21 is connected to a first end of the twenty-second switch transistor S22. A connection point between the twenty-first switch transistor S21 and the twenty-second switch transistor S22 is the midpoint (i.e., the connection point d) of the other bridge arm of the second full-bridge circuit unit 400. A second end of the twenty-first switch transistor S21 is connected to a second end of the nineteenth switch transistor S19, and a second end of the twenty-second switch transistor S22 is connected to a second end of the twentieth switch transistor S20. The fourth full-bridge circuit unit 600 includes a twenty-third switch transistor S23 and a twenty-fourth switch transistor S24 connected in series, and a twenty-fifth switch transistor S25 and a twenty-sixth switch transistor S26 connected in series. A first end of the twenty-third switch transistor S23 is connected to a first end of the twenty-fourth switch transistor S24. A connection point between the twenty-third switch transistor S23 and the twenty-fourth switch transistor S24 is the midpoint of one bridge arm of the fourth full-bridge circuit unit 600. A first end of the twenty-fifth switch transistor S25 is connected to a first end of the twenty-sixth switch transistor S26. A connection point between the twenty-fifth switch transistor S25 and the twenty-sixth switch transistor S26 is the midpoint of the other bridge arm of the fourth full-bridge circuit unit 600. A second end of the twenty-fifth switch transistor S25 is connected to a second end of the twenty-third switch transistor S23, and a second end of the twenty-sixth switch transistor S26 is connected to a second end of the twenty-fourth switch transistor S24. The sixth full-bridge circuit unit 800 includes a twenty-seventh switch transistor S27 and a twenty-eighth switch transistor S28 connected in series, and a twenty-ninth switch transistor S29 and a thirtieth switch transistor S30 connected in series. A first end of the twenty-seventh switch transistor S27 is connected to a first end of the twenty-eighth switch transistor S28. A connection point between the twenty-seventh switch transistor S27 and the twenty-eighth switch transistor S28 is the midpoint of one bridge arm of the sixth full-bridge circuit unit 800. A first end of the twenty-ninth switch transistor S29 is connected to a first end of the thirtieth switch transistor S30. A connection point between the twenty-ninth switch transistor S29 and the thirtieth switch transistor S30 is the midpoint of the other bridge arm of the sixth full-bridge circuit unit 800. A second end of the twenty-ninth switch transistor S29 is connected to a second end of the twenty-seventh switch transistor S27, and a second end of the thirtieth switch transistor S30 is connected to a second end of the twenty-eighth switch transistor S28.

In order to enable a person having ordinary skill in the art to more clearly understand the three-phase single-stage isolated bidirectional converter provided by the embodiments of the disclosure, the working mode of the three-phase single-stage isolated bidirectional converter is to be described in detail in the following paragraphs together with specific embodiments.

Taking the first module as an example, the other two modules work similarly to the first module.

To be specific, by inputting a driving signal to driving ends of the first to fourth switch transistors S1 to S4, the first to fourth switch transistors S1 to S4 are controlled to be turned on or off, so that the first full-bridge circuit unit 300 is controlled to work in the following two modes.

In mode 1, when the first switch transistor S1 and the fourth switch transistor S4 are in the on state, the second switch transistor S2 and the third switch transistor S3 are in the off state. In mode 2, when the second switch transistor S2 and the third switch transistor S3 are in the on state, the first switch transistor S1 and the fourth switch transistor S4 are in the off state.

Herein, a duty ratio of the driving signal of the first to fourth switch transistors S1 to S4 is 50%, and only one of the two switch transistors of the same bridge arm is in the on state. In each switching period $T_s$, mode 1 and mode 2 are each executed once, and the duration each accounts for 50%.

By inputting a driving signal to driving ends of the thirteenth switch transistor S13 and the fourteenth switch transistor S14, the thirteenth switch transistor S13 and the fourteenth switch transistor S14 are controlled to be turned on or off, so that the first half-bridge circuit unit 900 is controlled to work in the following mode.

If the three-phase single-stage isolated bidirectional converter works in a rectification mode, when a voltage $V_{g1}$ at an AC end is positive, the fourteenth switch transistor S14 is in the on state or in the off state, and the thirteenth switch transistor S13 is in the off state. When the voltage $V_{g1}$ at the AC end is negative, the thirteenth switch transistor S13 is in the on state or in the off state, and the fourteenth switch transistor S14 is in the off state. If the three-phase single-stage isolated bidirectional converter works in an inversion mode, when the voltage $V_{g1}$ at the AC end is positive, the thirteenth switch transistor S13 is in the on state, and the fourteenth switch transistor S14 is in the off state. When the voltage $V_{g1}$ at the AC end is negative, the fourteenth switch transistor S14 is in the on state, and the thirteenth switch transistor S13 is in the off state.

By inputting a driving signal to driving ends of the nineteenth to twenty-second switch transistors S19 to S22, the nineteenth to twenty-second switch transistors S19 to S22 are controlled to be turned on or off, so that the second full-bridge circuit unit 400 is controlled to work in the following four modes.

In mode 1, when the nineteenth switch transistor S19 and the twenty-second switch transistor S22 are in the on state, the twentieth switch transistor S20 and the twenty-first switch transistor S21 are in the off state. In mode 2, when the twentieth switch transistor S20 and the twenty-first switch transistor S21 are in the on state, the nineteenth switch transistor S19 and the twenty-second switch transistor S22 are in the off state. In mode 3, when the nineteenth switch transistor S19 and the twenty-first switch transistor S21 are in the on state, the twentieth switch transistor S20 and the twenty-second switch transistor S22 are in the off state. In mode 4, when the twentieth switch transistor S20 and the twenty-second switch transistor S22 are in the on state, the nineteenth switch transistor S19 and the twenty-first switch transistor S21 are in the off state.

Herein, the duty ratio of the driving signal of the nineteenth switch transistor S19 and the twenty-second switch transistor S22 is 50%, and only one of the two switch transistors of the same bridge arm is in the on state. In each switching period $T_s$, mode 1, mode 2, mode 3, and mode 4 are each executed once, and the execution sequence and time of the modes depend on an internal phase relationship of the driving signal turned on or off by the switch transistor S19 to S22.

It should be noted that a power factor of a current $i_{g1}$ at the AC end and an input/output power at a DC end may be controlled through the internal phase relationship of the driving signal turned on or off by the switch transistor S19 to S22 in the second full-bridge circuit unit 400 and an external phase relationship between the driving signal of the second full-bridge circuit unit 400 and the driving signal of the first full-bridge circuit unit 300. When a rectifier works, the driving signal of the first full-bridge circuit unit 300 leads the driving signal of the second full-bridge circuit unit 400, and energy is transmitted from the AC end to the DC end. When an inverter works, the driving signal of the first full-bridge circuit unit 300 lags behind the driving signal of the second full-bridge circuit unit 400, and the energy is transmitted from the DC end to the AC end.

In view of the above, the three-phase single-stage isolated bidirectional converter provided by the disclosure only includes one stage of power conversion, so the converter exhibits low loss and high efficiency. Further, the three-phase single-stage isolated bidirectional converter provided by the disclosure only includes high-frequency filter capacitors with small capacitance to filter the current ripple of the switching frequency and does not include a large-capacity bus capacitor to act as an energy buffer unit, so an aluminum electrolytic capacitor is not needed, and that the converter is small in size and has a long service life. Further, the three-phase single-stage isolated bidirectional converter provided by the disclosure does not need a boost inductor, produces little electromagnetic interference on the power grid, and does not cause additional loss of the semiconductor switch transistors nor core loss of the phase-shift inductors. The topological structure does not have the characteristics of a boost inductor, and therefore, the volume of the converter and the loss of magnetic parts are reduced, and the costs of the converter are thus lowered.

In view of the above, the three-phase single-stage isolated bidirectional converter provided by the embodiments of the disclosure includes the three-phase AC voltage port, the DC voltage port, the first to sixth full-bridge circuit units, the first to third half-bridge circuit units, the first to third phase-shift inductor units, the first to third transformers, and the first to third filter capacitors. Herein, the three-phase AC voltage port includes the first to sixth ports, and the DC voltage port includes the seventh port and the eighth port. The first transformer includes the first winding and the second winding. The first winding is provided with the first center tap, and the first center tap is connected to the first port. The two ends of the first winding are respectively connected to the midpoints of the two bridge arms of the first full-bridge circuit unit through the first phase-shift inductor unit. The two ends of the second winding are respectively connected to the midpoints of the two bridge arms of the second full-bridge circuit unit. The second transformer includes the third winding and the fourth winding. The third winding is provided with the second center tap, and the second center tap is connected to the third port. The two ends of the third winding are respectively connected to the midpoints of the two bridge arms of the third full-bridge circuit unit through the second phase-shift inductor unit. The two ends of the fourth winding are respectively connected to the midpoints of the two bridge arms of the fourth full-bridge circuit unit. The third transformer includes the fifth winding and the sixth winding. The fifth winding is provided with the third center tap, and the third center tap is connected to the fifth port. The two ends of the fifth winding are respectively connected to the midpoints of the two bridge arms of the fifth full-bridge circuit unit through the third phase-shift inductor unit. The two ends of the sixth winding are respectively connected to the midpoints of the two bridge arms of the sixth full-bridge circuit unit. The two ends of the first full-bridge circuit unit are respectively connected to the two ends of the first half-bridge circuit unit. The two ends of the third full-bridge circuit unit are respectively connected to the two ends of the second half-bridge circuit unit. The two ends of the fifth full-bridge circuit unit respectively are respectively connected to the two ends of the third half-bridge circuit unit. The two ends of the first half-bridge circuit unit are further connected to the two ends of the first filter capacitor, and the midpoint of the bridge arm of the first half-bridge circuit unit is connected to the second port. The two ends of the second half-bridge circuit unit are further connected to the two ends of the second filter capacitor, and the midpoint of the bridge arm of the second half-bridge circuit unit is connected to the fourth port. The two ends of the third half-bridge circuit unit are further connected to the two ends of the third filter capacitor, and the midpoint of the bridge arm of the third half-bridge circuit unit is connected to the sixth port. The two ends of the second full-bridge circuit unit are respectively connected to the seventh port and the eighth port. The two ends of the fourth full-bridge circuit unit are respectively connected to the seventh port and the eighth port. The two ends of the sixth full-bridge circuit unit are respectively connected to the seventh port and the eighth port. In this way, only one stage of power conversion is included, so the working efficiency and accuracy of the converter are improved, and the reliability of the system is enhanced.

Corresponding to the above embodiments, the disclosure further provides a method of controlling the three-phase single-stage isolated bidirectional converter.

To be specific, the method of controlling the three-phase single-stage isolated bidirectional converter provided by the embodiments of the disclosure includes the following steps. When a rectification control command or an inversion control command is received, a DC current of the DC voltage port is sampled. A three-phase AC voltage and a three-phase AC current of the three-phase AC voltage port are sampled. A dual closed-loop control strategy is adopted to generate a driving signal with a duty ratio of 50% according to the DC current, the three-phase AC voltage, and the three-phase AC current. Further, the driving signal is sent to driving ends of the first to thirtieth switch transistors to control the three-phase single-stage isolated bidirectional converter to work in the rectification mode or the inversion mode.

According to an embodiment of the disclosure, when the three-phase single-stage isolated bidirectional converter works in the rectification mode, a driving signal corresponding to the first full-bridge circuit unit is controlled to lead a driving signal corresponding to the second full-bridge circuit unit. A driving signal corresponding to the third full-bridge circuit unit is controlled to lead a driving signal corresponding to the fourth full-bridge circuit unit. Further, a driving signal corresponding to the fifth full-bridge circuit unit is controlled to lead a driving signal corresponding to the sixth full-bridge circuit unit. The dual closed-loop control strategy is adopted to calculate a phase angle at which the driving signal corresponding to the first full-bridge circuit unit is leads the driving signal corresponding to the second full-bridge circuit unit, a phase angle at which the driving signal corresponding to the third full-bridge circuit unit leads the driving signal corresponding to the fourth full-bridge circuit unit, and a phase angle at which the driving signal corresponding to the fifth full-bridge circuit unit leads the driving signal corresponding to the sixth full-bridge circuit unit.

According to an embodiment of the disclosure, when the three-phase single-stage isolated bidirectional converter works in the inversion mode, the driving signal corresponding to the first full-bridge circuit unit is controlled to lag behind the driving signal corresponding to the second full-bridge circuit unit. The driving signal corresponding to the third full-bridge circuit unit is controlled to lag behind the driving signal corresponding to the fourth full-bridge circuit unit. The driving signal corresponding to the fifth full-bridge circuit unit is controlled to lag behind the driving signal corresponding to the sixth full-bridge circuit unit. The dual closed-loop control strategy is adopted to calculate a phase angle at which the driving signal corresponding to the first full-bridge circuit unit lags behind the driving signal corresponding to the second full-bridge circuit unit, a phase angle at which the driving signal corresponding to the third full-bridge circuit unit lags behind the driving signal corresponding to the fourth full-bridge circuit unit, and a phase angle at which the driving signal corresponding to the fifth full-bridge circuit unit lags behind the driving signal corresponding to the sixth full-bridge circuit unit.

Figure 2:
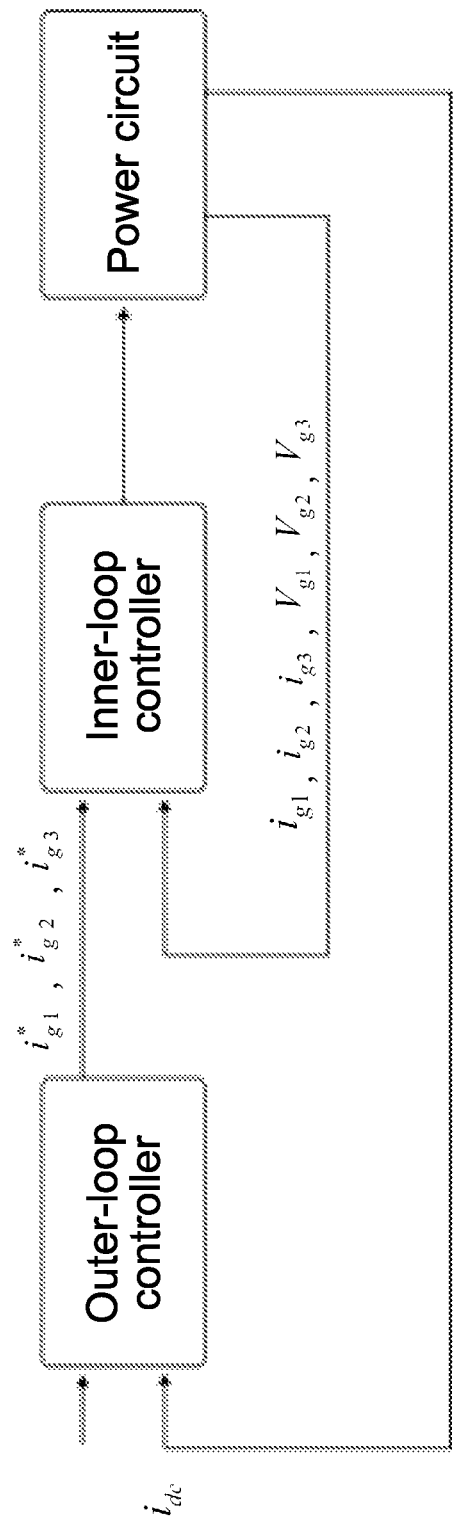
FIG. 2 is a schematic structural diagram of a dual closed-loop control system according to an embodiment of the disclosure.

To be specific, as shown in FIG. 2, when the rectification control command or the inversion control command is received, a DC current $i_{dc}$ of the DC voltage port 200 is sampled by an outer-loop controller in a dual closed-loop control system (sampled by a current sensor). At this time, the outer-loop controller generates three-phase current reference values $i^*_{g1}$, $i^*_{g2}$ and $i^*_{g3}$ through internal control and transmits the three-phase current reference values $i^*_{g1}$, $i^*_{g2}$ and $i^*_{g3}$ to an inner-loop controller in the dual closed-loop control system. Herein, as a possible way of implementation, the outer-loop controller generates the three-phase current reference values $i^*_{g1}$, $i^*_{g2}$ and $i^*_{g3}$ transmitted to the inner-loop controller through a PI controller and a saturation limiting unit. The inner-loop controller samples the three-phase AC current of the three-phase AC voltage port 100 through the current sensor and samples the three-phase AC voltage of the three-phase AC voltage port 100 through a voltage sensor. Herein, the inner-loop controller can generate driving signals with a duty ratio of 50% and having a phase-shift relationship among them and can transmit these driving signals to a driver of a power circuit for driving, so as to control the current $i_{g1}$ of the three-phase AC port 100 and the current $i_{dc}$ of the DC voltage port 200. Specifically, reference may be made to the abovementioned embodiments for the method of controlling the first to thirtieth switch transistors S1 to S30 by means of the driving signals with a duty ratio of 50% and having a phase-shift phase relationship among them. Details thereof are not provided herein in order to avoid redundancy.

It should be noted that when the three-phase single-stage isolated bidirectional converter works in the rectification mode, an outer phase-shift angle $\varphi_O$ (led phase angle) of each module (first to third modules) may be generated by the dual closed-loop control system. Further, the driving signal corresponding to the first full-bridge circuit unit is controlled to lead the driving signal corresponding to the second full-bridge circuit unit according to the outer phase-shift angle $\varphi_O$. The driving signal corresponding to the third full-bridge circuit unit is controlled to lead the driving signal corresponding to the fourth full-bridge circuit unit. Further, the driving signal corresponding to the fifth full-bridge circuit unit is controlled to lead the driving signal corresponding to the sixth full-bridge circuit unit. When the three-phase single-stage isolated bidirectional converter works in the inversion mode, the outer phase-shift angle $\varphi_O$ (lagged phase angle) of each module (first to third modules) may be generated by the dual closed-loop control system. Further, the driving signal corresponding to the first full-bridge circuit unit is controlled to lag behind the driving signal corresponding to the second full-bridge circuit unit according to the outer phase-shift angle $\varphi_O$. The driving signal corresponding to the third full-bridge circuit unit is controlled to lag behind the driving signal corresponding to the fourth full-bridge circuit unit. The driving signal corresponding to the fifth full-bridge circuit unit is controlled to lag behind the driving signal corresponding to the sixth full-bridge circuit unit. Besides, an inner phase-shift angle $\varphi_i$ of each module (first to third modules) is also generated by the dual closed-loop control system and is outputted to a PWM generator to send out a PWM waveform, so that a waveform of the current $i_{g1}$ of the three-phase AC port 100 is controlled.

Herein, the inner phase-shift angle $\varphi_i$ may be obtained through a look-up table method according to a look-up table curve. The look-up table curve is based on real-time power combined with the real-time grid voltages $V_{g^1}$, $V_{g^2}$, and $V_{g^3}$ and a battery voltage $U_b$ through a theoretical calculation formula of a minimum current stress or the inner phase-shift angle $\varphi_i$ corresponding to a best loss operating point obtained by an experiment.

It should be noted that the outer phase-shift angle $\varphi_O$ is a phase difference between a midpoint of a positive half-cycle square-wave voltage generated by a switching action of a full-bridge arm at the AC end and a mid-point of a positive half-cycle square-wave voltage generated by a switching action of a full-bridge arm at the DC end. The phase difference is determined by the phase relationship between the driving signals of the full-bridge arm at the AC end and the full-bridge arm at the DC end. The inner phase-shift angle $\varphi_i$ is a phase width of the positive half-cycle square wave voltage generated by the switching action of the full-bridge arm at the DC end. The width is determined by the phase relationship between the driving signals of the two half-bridge arms of the full-bridge arm at the DC side.

Therefore, in the disclosure, the closed-loop control problem of the three-phase single-stage isolated AC/DC bidirectional converter is solved. The two closed-loop controllers of the three-phase circuit may be implemented by one control chip. Further, since the driving signals of the full-bridge arms of the three-phase primary side are shared, the total number of PWM signals is small, which is conducive to the use of one single chip to control the overall circuit. In addition, the optimized efficiency under different DC voltages and different power levels may be achieved through the inner phase-shift look-up table, which is suitable for application in actual products.

According to the method of controlling the three-phase single-stage isolated bidirectional converter provided by the embodiments of the disclosure, when a rectification control command or an inversion control command is received, the DC current of the DC voltage port is sampled. The three-phase AC voltage and the three-phase AC current of the three-phase AC voltage port are sampled. The dual closed-loop control strategy is adopted to generate a driving signal with a duty ratio of 50% according to the DC current, the three-phase AC voltage, and the three-phase AC current. Further, the driving signal is sent to the driving ends of the first to thirtieth switch transistors to control the three-phase single-stage isolated bidirectional converter to work in the rectification mode or the inversion mode. Therefore, only one stage of power conversion is included, and the dual closed-loop control strategy is used to generate a driving signal with a duty ratio of 50% for control. In this way, the working efficiency and accuracy of the converter are improved, and the reliability of the system is enhanced.

In the description of the disclosure, the terms "first" and "second" are only used for descriptive purposes and cannot be understood as indicating or implying relative importance or implicitly indicating the number of indicated technical features. Thus, the features defined with "first" and "second" may explicitly or implicitly include one or more of these features. The term "plurality" means one or more than one unless specifically defined otherwise.

In the disclosure, unless clearly specified and defined otherwise, the terms "installed", "connected", "connecting", "fixed" and other terms should be understood in a broad sense, for instance, it can be a fixed connection, a detachable connection, or an integral connection, it can be a mechanical connection or an electrical connection, it can be a direct connection or an indirect connection through an intermediate medium, and it can be an internal communication between two components or an interaction relationship between two components. For a person having ordinary skill in the art, the specific meaning of the above-mentioned terms in the disclosure can be understood according to specific circumstances.

In the disclosure, unless otherwise clearly specified and defined, a first feature being "on" or "under" a second feature may mean that the first and second features are in direct contact, or the first and second features are in indirect contact through an intermediate medium. Further, the first feature being "on", "above", and "upon" the second feature may mean that the first feature is directly above or obliquely above the second feature, or simply means that the level of the first feature is higher than that of the second feature. The first feature being "under", "below", and "beneath" the second feature may mean that the first feature is directly under or obliquely under the second feature, or simply means that the level of the first feature is lower than that of the second feature.

In the description of the specification, descriptions with reference to the terms such as "one embodiment", "some embodiments", "examples", "specific examples", or "some examples" etc. means that the specific features, structures, materials, or characteristics described in combination with the embodiment(s) or example(s) are included in at least one embodiment or example of the disclosure. In the specification, the schematic representation of the above-mentioned terms does not necessarily refer to the same embodiment or example. Further, the described specific features, structures, materials, or characteristics may be combined in any one or more embodiments or examples in a suitable manner. Besides, a person having ordinary skill in the art may reincorporate and combine different embodiments or examples and features of different embodiments or examples described in the specification without conflicting with each other.

Any process or method descriptions in the flow chart or otherwise described herein may be understood to represent modules, segments, or portions of code including one or more executable instructions for implementing specific logical functions or steps of the process. Further, the scope of the preferred embodiments of the disclosure includes alternative implementations in which functions may be performed out of the order shown or discussed, including substantially concurrent or in reverse order, depending upon the functions involved, which should be recognized by a person having ordinary skill in the art.

The logic and/or steps represented in the flow chart or otherwise described herein, such as a sequenced list of executable instructions, which are considered to be used to implement logical functions, may be embodied in any computer readable medium for use by or in together with, an instruction execution system, apparatus, or device (e.g., a computer-based system, a system including a processor, or other systems that can fetch and execute instructions from an instruction execution system, device, or apparatus). In the specification, the "computer-readable medium" may be any means that can contain, store, communicate, propagate, or transport the program for use by or together with an instruction execution system, device, or apparatus. More specific examples (non-exhaustive list) of the computer-readable medium include the following: an electrical connection portion (electronic device) with one or more wires, a portable computer disk case (magnetic device), a random access memory (RAM), a read-only memory (ROM), an erasable programmable read-only memory (EPROM or flash memory), a fiber optic device, and a portable optical disk ROM (CD-ROM). Besides, the computer-readable medium may even be paper or other suitable medium on which the program may be printed, as the paper or other medium may be scanned, for example, optically. The program is then obtained electronically by editing, interpreting or, if necessary, processing in another suitable manner, and the program is then stored in a computer memory.

It should be understood that various parts of the disclosure may be implemented by hardware, software, firmware, or a combination thereof. In the embodiments described above, various steps or methods may be implemented by software or firmware stored in memory and executed by a suitable instruction execution system. For instance, if implemented in hardware, as in another embodiment, it can be implemented by any one or a combination of the following techniques known in the art: a discrete logic circuit with logic gates for implementing logic functions on data signals, an application specific integrated circuit with appropriate combinational logic gates, a programmable gate array (PGA), a field programmable gate array (FPGA), etc.

A person having ordinary skill in the art can understand that all or part of the steps carried out in the method of the above embodiments can be implemented by instructing related hardware through a program. The program can be stored in a computer-readable storage medium, and when the program is executed, it includes one of the steps of the method embodiments or a combination thereof.

In addition, in the embodiments of the disclosure, each functional unit may be integrated into one processing module, or each unit may exist alone physically, or two or more units may be integrated into one module. The integrated module may be implemented in the form of hardware or in the form of a software functional module. If the integrated module is implemented in the form of a software functional module and sold or used as an independent product, it may also be stored in a computer-readable storage medium.

The storage medium mentioned above may be a read-only memory, a magnetic disk, or an optical disk, and the like. Although the embodiments of the disclosure have been shown and described above, it can be understood that the above-mentioned embodiments are exemplary and should not be construed as limiting the disclosure. A person having ordinary skill in the art may make changes, corrections, substitutions, and modifications to the abovementioned embodiments within the scope of the disclosure.

What is claimed is:

1. A three-phase single-stage isolated bidirectional converter, comprising a three-phase alternating current (AC) voltage port, a direct current (DC) voltage port, first to sixth full-bridge circuit units, first to third half-bridge circuit units, first to third phase-shift inductor units, first to third transformers, and first to third filter capacitors, wherein
the three-phase AC voltage port comprises first to sixth ports,
the DC voltage port comprises a seventh port and an eighth port,
the first transformer comprises a first winding and a second winding, the first winding is provided with a first center tap, the first center tap is connected to the first port, two ends of the first winding are respectively connected to midpoints of two bridge arms of the first full-bridge circuit unit through the first phase-shift inductor unit, two ends of the second winding are respectively connected to midpoints of two bridge arms of the second full-bridge circuit unit, wherein the second transformer comprises a third winding and a fourth winding, the third winding is provided with a second center tap, the second center tap is connected to the third port, two ends of the third winding are respectively connected to midpoints of two bridge arms of the third full-bridge circuit unit through the second phase-shift inductor unit, two ends of the fourth winding are respectively connected to midpoints of two bridge arms of the fourth full-bridge circuit unit, wherein the third transformer comprises a fifth winding and a sixth winding, the fifth winding is provided with a third center tap, the third center tap is connected to the fifth port, two ends of the fifth winding are respectively connected to midpoints of two bridge arms of the fifth full-bridge circuit unit through the third phase-shift inductor unit, and two ends of the sixth winding are respectively connected to midpoints of two bridge arms of the sixth full-bridge circuit unit, two ends of the first full-bridge circuit unit are respectively connected to two ends of the first half-bridge circuit unit, two ends of the third full-bridge circuit unit are respectively connected to two ends of the second half-bridge circuit unit, and two ends of the fifth full-bridge circuit unit are respectively connected to two ends of the third half-bridge circuit unit, the two ends of the first half-bridge circuit unit are further connected to two ends of the first filter capacitor, a midpoint of a bridge arm of the first half-bridge circuit unit is connected to the second port, the two ends of the second half-bridge circuit unit are further connected to two ends of the second filter capacitor, a midpoint of a bridge arm of the second half-bridge circuit unit is connected to the fourth port, the two ends of the third half-bridge circuit unit are further connected to two ends of the third filter capacitor, and a midpoint of a bridge arm of the third half-bridge circuit unit is connected to the sixth port, two ends of the second full-bridge circuit unit are respectively connected to the seventh port and the eighth port, two ends of the fourth full-bridge circuit unit are respectively connected to the seventh port and the eighth port, and two ends of the sixth full-bridge circuit unit are respectively connected to the seventh port and the eighth port.

2. The three-phase single-stage isolated bidirectional converter according to claim 1, wherein the first full-bridge circuit unit comprises:
a first switch transistor and a second switch transistor connected in series, wherein a first end of the first switch transistor is connected to a first end of the second switch transistor, and a connection point between the first switch transistor and the second switch transistor is a first midpoint of the midpoints of the two bridge arms of the first full-bridge circuit unit; and
a third switch transistor and a fourth switch transistor connected in series, wherein a first end of the third switch transistor is connected to a first end of the fourth switch transistor, a connection point between the third switch transistor and the fourth switch transistor is a second midpoint of the midpoints of the two bridge arms of the first full-bridge circuit unit, a second end of the third switch transistor is connected to a second end of the first switch transistor, and a second end of the fourth switch transistor is connected to a second end of the second switch transistor,
wherein the third full-bridge circuit unit comprises:
a fifth switch transistor and a sixth switch transistor connected in series, wherein a first end of the fifth switch transistor is connected to a first end of the sixth switch transistor, and a connection point between the fifth switch transistor and the sixth switch transistor is a first midpoint of the midpoints of the two bridge arms of the third full-bridge circuit unit; and a seventh switch transistor and an eighth switch transistor connected in series, wherein a first end of the seventh switch transistor is connected to a first end of the eighth switch transistor, a connection point between the seventh switch transistor and the eighth switch transistor is a second midpoint of the midpoints of the two bridge arms of the third full-bridge circuit unit, a second end of the seventh switch transistor is connected to a second end of the fifth switch transistor, and a second end of the eighth switch transistor is connected to a second end of the sixth switch transistor, wherein the fifth full-bridge circuit unit comprises:

a ninth switch transistor and a tenth switch transistor connected in series, wherein a first end of the ninth switch transistor is connected to a first end of the tenth switch transistor, and a connection point between the ninth switch transistor and the tenth switch transistor is a first midpoint of the midpoints of the two bridge arms of the fifth full-bridge circuit unit; and an eleventh switch transistor and a twelfth switch transistor connected in series, wherein a first end of the eleventh switch transistor is connected to a first end of the twelfth switch transistor, a connection point between the eleventh switch transistor and the twelfth switch transistor is a second midpoint of the midpoints of the two bridge arms of the fifth full-bridge circuit unit, a second end of the eleventh switch transistor is connected to a second end of the ninth switch transistor, and a second end of the twelfth switch transistor is connected to a second end of the tenth switch transistor.

3. The three-phase single-stage isolated bidirectional converter according to claim 2, wherein the first half-bridge circuit unit comprises:

a thirteenth switch transistor and a fourteenth switch transistor connected in series, wherein a first end of the thirteenth switch transistor is connected to a first end of the fourteenth switch transistor, a connection point between the thirteenth switch transistor and the fourteenth switch transistor is the midpoint of the bridge arm of the first half-bridge circuit unit, a second end of the thirteenth switch transistor is connected to the second end of the third switch transistor, and a second end of the fourteenth switch transistor is connected to the second end of the fourth switch transistor, wherein the second half-bridge circuit unit comprises:

a fifteenth switch transistor and a sixteenth switch transistor connected in series, wherein a first end of the fifteenth switch transistor is connected to a first end of the sixteenth switch transistor, a connection point between the fifteenth switch transistor and the sixteenth switch transistor is the midpoint of the bridge arm of the second half-bridge circuit unit, a second end of the fifteenth switch transistor is connected to the second end of the seventh switch transistor, and a second end of the sixteenth switch transistor is connected to the second end of the eighth switch transistor, wherein the third half-bridge circuit unit comprises:

a seventeenth switch transistor and an eighteenth switch transistor connected in series, wherein a first end of the seventeenth switch transistor is connected to a first end of the eighteenth switch transistor, a connection point between the seventeenth switch transistor and the eighteenth switch transistor is the midpoint of the bridge arm of the third half-bridge circuit unit, a second end of the seventeenth switch transistor is connected to the second end of the eleventh switch transistor, and a second end of the eighteenth switch transistor is connected to the second end of the twelfth switch transistor.

4. The three-phase single-stage isolated bidirectional converter according to claim 3, wherein the first phase-shift inductor unit comprises:

a first phase-shift inductor, wherein one end of the first phase-shift inductor is connected to the first midpoint of the two bridge arms of the first full-bridge circuit unit, and the other end of the first phase-shift inductor is connected to one end of the first winding; and a second phase-shift inductor, wherein one end of the second phase-shift inductor is connected to the second midpoint of the two bridge arms of the first full-bridge circuit unit, and the other end of the second phase-shift inductor is connected to the other end of the first winding, wherein the second phase-shift inductor unit comprises:

a third phase-shift inductor, wherein one end of the third phase-shift inductor is connected to the first midpoint of the two bridge arms of the third full-bridge circuit unit, and the other end of the third phase-shift inductor is connected to one end of the third winding; and a fourth phase-shift inductor, wherein one end of the fourth phase-shift inductor is connected to the second midpoint of the two bridge arms of the third full-bridge circuit unit, and the other end of the fourth phase-shift inductor is connected to the other end of the third winding, wherein the third phase-shift inductor unit comprises:

a fifth phase-shift inductor, wherein one end of the fifth phase-shift inductor is connected to the first midpoint of the two bridge arms of the fifth full-bridge circuit unit, and the other end of the fifth phase-shift inductor is connected to one end of the fifth winding; and a sixth phase-shift inductor, wherein one end of the sixth phase-shift inductor is connected to the second midpoint of the two bridge arms of the fifth full-bridge circuit unit, and the other end of the sixth phase-shift inductor is connected to the other end of the fifth winding.

5. The three-phase single-stage isolated bidirectional converter according to claim 4, wherein the second full-bridge circuit unit comprises:

a nineteenth switch transistor and a twentieth switch transistor connected in series, wherein a first end of the nineteenth switch transistor is connected to a first end of the twentieth switch transistor, and a connection point between the nineteenth switch transistor and the twentieth switch transistor is a first midpoint of the midpoints of the two bridge arms of the second full-bridge circuit unit; and a twenty-first switch transistor and a twenty-second switch transistor connected in series, wherein a first end of the twenty-first switch transistor is connected to a first end of the twenty-second switch transistor, a connection point between the twenty-first switch transistor and the twenty-second switch transistor is a second midpoint of the midpoints of the two bridge arms of the second full-bridge circuit unit, a second end of the twenty-first switch transistor is connected to a second end of the nineteenth switch transistor, and a second end of the twenty-second switch transistor is connected to a second end of the twentieth switch transistor, wherein the fourth full-bridge circuit unit comprises:
a twenty-third switch transistor and a twenty-fourth switch transistor connected in series, wherein a first end of the twenty-third switch transistor is connected to a first end of the twenty-fourth switch transistor, and a connection point between the twenty-third switch transistor and the twenty-fourth switch transistor is a first midpoint of the midpoints of the two bridge arms of the fourth full-bridge circuit unit; and a twenty-fifth switch transistor and a twenty-sixth switch transistor connected in series, wherein a first end of the twenty-fifth switch transistor is connected to a first end of the twenty-sixth switch transistor, a connection point between the twenty-fifth switch transistor and the twenty-sixth switch transistor is a second midpoint of the midpoints of the two bridge arms of the fourth full-bridge circuit unit, a second end of the twenty-fifth switch transistor is connected to a second end of the twenty-third switch transistor, and a second end of the twenty-sixth switch transistor is connected to a second end of the twenty-fourth switch transistor, wherein the sixth full-bridge circuit unit comprises:
a twenty-seventh switch transistor and a twenty-eighth switch transistor connected in series, wherein a first end of the twenty-seventh switch transistor is connected to a first end of the twenty-eighth switch transistor, a connection point between the twenty-seventh switch transistor and the twenty-eighth switch transistor is a first midpoint of the midpoints of the two bridge arms of the sixth full-bridge circuit unit; and a twenty-ninth switch transistor and a thirtieth switch transistor connected in series, wherein a first end of the twenty-ninth switch transistor is connected to a first end of the thirtieth switch transistor, a connection point between the twenty-ninth switch transistor and the thirtieth switch transistor is a second midpoint of the midpoints of the two bridge arms of the sixth full-bridge circuit unit, a second end of the twenty-ninth switch transistor is connected to a second end of the twenty-seventh switch transistor, and a second end of the thirtieth switch transistor is connected to a second end of the twenty-eighth switch transistor.

6. A method of controlling the three-phase single-stage isolated bidirectional converter according to claim 5, comprising:
sampling a DC current of the DC voltage port when a rectification control command or an inversion control command is received; sampling a three-phase AC voltage and a three-phase AC current of the three-phase AC voltage port; adopting a dual closed-loop control strategy to generate a driving signal with a duty ratio of 50% according to the DC current, the three-phase AC voltage, and the three-phase AC current; and sending the driving signal to driving ends of the first to thirtieth switch transistors to control the three-phase single-stage isolated bidirectional converter to work in a rectification mode or an inversion mode.

7. The method of controlling the three-phase single-stage isolated bidirectional converter according to claim 6, further comprising:
when the three-phase single-stage isolated bidirectional converter works in the rectification mode, controlling the driving signal corresponding to the first full-bridge circuit unit to lead the driving signal corresponding to the second full-bridge circuit unit, controlling the driving signal corresponding to the third full-bridge circuit unit to lead the driving signal corresponding to the fourth full-bridge circuit unit, and controlling the driving signal corresponding to the fifth full-bridge circuit unit to lead the driving signal corresponding to the sixth full-bridge circuit unit; and adopting the dual closed-loop control strategy to calculate a phase angle at which the driving signal corresponding to the first full-bridge circuit unit leads the driving signal corresponding to the second full-bridge circuit unit, a phase angle at which the driving signal corresponding to the third full-bridge circuit unit leads the driving signal corresponding to the fourth full-bridge circuit unit, and a phase angle at which the driving signal corresponding to the fifth full-bridge circuit unit leads the driving signal corresponding to the sixth full-bridge circuit unit.

8. The method of controlling the three-phase single-stage isolated bidirectional converter according to claim 7, further comprising:
when the three-phase single-stage isolated bidirectional converter works in the inversion mode, controlling the driving signal corresponding to the first full-bridge circuit unit to lag behind the driving signal corresponding to the second full-bridge circuit unit, controlling the driving signal corresponding to the third full-bridge circuit unit to lag behind the driving signal corresponding to the fourth full-bridge circuit unit, and controlling the driving signal corresponding to the fifth full-bridge circuit unit to lag behind the driving signal corresponding to the sixth full-bridge circuit unit; and adopting the dual closed-loop control strategy to calculate a phase angle at which the driving signal corresponding to the first full-bridge circuit unit lags behind the driving signal corresponding to the second full-bridge circuit unit, a phase angle at which the driving signal corresponding to the third full-bridge circuit unit lags behind the driving signal corresponding to the fourth full-bridge circuit unit, and a phase angle at which the driving signal corresponding to the fifth full-bridge circuit unit lags behind the driving signal corresponding to the sixth full-bridge circuit unit.

* * * * *